(12) United States Patent
Castillo et al.

(10) Patent No.: US 9,124,563 B2
(45) Date of Patent: Sep. 1, 2015

(54) METHOD FOR ASYNCHRONOUSLY PROVISIONING KEYS FROM ONE SECURE DEVICE TO ANOTHER

(71) Applicant: Gemalto SA, Meudon Cedex (FR)

(72) Inventors: Laurent Castillo, Austin, TX (US); HongQian Karen Lu, Austin, TX (US); Asad Ali, Austin, TX (US)

(73) Assignee: GEMALTO SA, Meudon (FR)

( * ) Notice: Subject to any disclaimer, the term of this patent is extended or adjusted under 35 U.S.C. 154(b) by 29 days.

(21) Appl. No.: 13/969,903

(22) Filed: Aug. 19, 2013

(65) Prior Publication Data

US 2015/0052359 A1    Feb. 19, 2015

(51) Int. Cl.
*H04L 29/06* (2006.01)

(52) U.S. Cl.
CPC ............ *H04L 63/061* (2013.01); *H04L 63/062* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 8,397,083 B1 * | 3/2013 | Sussland et al. | 713/193 |
| 2011/0126012 A1 * | 5/2011 | Ben-Ami et al. | 713/168 |
| 2011/0154041 A1 * | 6/2011 | Godfrey et al. | 713/171 |
| 2011/0252229 A1 * | 10/2011 | Belenkiy et al. | 713/155 |
| 2013/0110943 A1 * | 5/2013 | Menon et al. | 709/206 |
| 2014/0011541 A1 * | 1/2014 | Cormier et al. | 455/558 |

* cited by examiner

*Primary Examiner* — Justin T Darrow
*Assistant Examiner* — Andrew Steinle
(74) *Attorney, Agent, or Firm* — Buchanan Ingersoll & Rooney PC

(57) ABSTRACT

A method to securely and asynchronously provisioning keys from one source secure device to a target secure device through a key provisioning server, in which the keys to be provisioned via the method remain unknown. The method includes the steps of, for the source secure device, encrypting a key to be transferred using a transport key so that only the target secure device can decrypt, and sending the encrypted key to the provisioning server and, for the target secure device, when available, getting the encrypted transferred key, and decrypting the transferred key using the transport key.

14 Claims, 2 Drawing Sheets

METHOD FOR ASYNCHRONOUSLY PROVISIONING KEYS FROM ONE SECURE DEVICE TO ANOTHER

FIELD OF THE INVENTION

The present invention relates to a method to securely and asynchronously provision keys from one source secure device to a target secure device through a server for which the keys to be provisioned through the method remain unknown to said server.

The invention also pertains to a key provisioning server useful for the implementation of said method.

BACKGROUND OF THE INVENTION

Along with the proliferation of mobile devices and Cloud services, the desire of access anytime, anywhere, and on any device, and rapid rise of malware and cyber attacks, the need for provisioning cryptographic keys to the devices becomes necessary and critical. Existing services provision keys from a key management server to devices. This leaves those services vulnerable to the server being compromised. However there is currently no service that provisions keys from one device to another as soon as the two devices cannot talk directly to each other.

Consequently, many situations cannot currently be addressed by the known systems. Among these situations, one person that usually authenticates to her company's network using her laptop with her smart card cannot do the same from her smartphone or another device. The IT would need to provision her smartphone using her corporate credentials in her badge.

Situations where people want to share files, between people or between devices, are also not addressed easily. For example, the file of a first person is stored in a shared directory after encryption using keys stored in the UICC in the first person's tablet. The encryption key for the shared file needs to be transferred from the first person's UICC to the second person's secure element (SE), so that this second person can decrypt the file too.

Situations relative to Internet of Things (IoT) are also encountered, for example, when somebody having a smart meter at home wants to control it from his phone. The smart meter configurations, readings and actuators are protected using cryptographic keys. The utility company that manages the meters needs to transfer these keys to the home owner's phone and needs to be able to update the keys periodically.

Secure Cloud access is also concerned by the invention as Public Cloud Providers offer APIs to their customer to control access to their resources (Storage, Compute power, Network). In fact, these APIs are the main way to access Cloud Resources. APIs are protected, when secured, with API keys or other cryptographic keys. The protection of these keys is critical for the security of the end customers' resources. The Public Cloud Provider needs a secure way to transfer the API keys from his infrastructure Hardware Security Module (HSM) to the end customers' devices.

SUMMARY OF THE INVENTION

The present invention aims at filling the current lack of such service.

The present invention is defined, in its broadest sense, as a method comprising the steps of:
triggering a key transfer at a key provisioning server,
for the key provisioning server,
    making a first access control decision to allow or disallow the key transfer, and
    if the transfer is allowed, sending a source asynchronous notification to the source secure device,
when available, for the source secure device,
    encrypting a key to be transferred using a transport key so that only the target secure device can decrypt, and
    sending the encrypted key to the provisioning server,
for the provisioning server,
    making a second access control decision, and
    if the transfer is allowed, sending a target asynchronous notification to the target secure device,
for the target secure device, when available,
    getting the encrypted transferred key, and
    decrypting the transferred key using the transport key.

Therefore, the method according to the present invention proposes to use a key provisioning server working asynchronously with several devices and having no knowledge of the transferred keys. The method of the invention enables several devices to rely on a central server to manage the distribution of their own keys to a plurality of devices or users in a secure way. According to the invention, the transferred key and the transport key are only known or knowable by the concerned devices. The provisioning server and any entities on the communication path never see these keys. This scheme protects the key owners because the keys are only accessible by the intended devices. It is also advantageous to the provisioning server's developers and operators because they do not need to be concerned with the customer keys that are only intended for the customers' devices.

In an advantageous implementation, said server is a web application server. This implementation particularly concerns any cloud storage application. The invention enables any device to encrypt data stored by cloud services and to share such data with other devices. The use of a web application server is particularly adapted to this context. However it can be noted here that any operated service model as implemented in servers should fit for cloud storage applications.

According to an advantageous embodiment, the method further includes, following the sending of the source asynchronous notification, the steps of:
for the source secure device, when available, sending a request to the provisioning server to get transport key information,
for the provisioning server, sending transport key information to the source secure device,
for the source secure device:
    generating or retrieving the transport key using transport key information,
    encrypting the key to be transferred using the transport key,
    sending the encrypted key and the key transfer information to the provisioning server.

The invention makes use of the faculty to dissociate transport key information enabling a device to generate or retrieve the transport key from the key information itself. The key provisioning server thus stores such transport key information and provides such information to one or several devices when needed.

Advantageously, the method further includes, following the sending of the target asynchronous notification, the steps of:
for the target secure device, when available, sending a request to the provisioning server to get the transferred key,
for the provisioning server, sending a key transfer information, which indicates how the transport key can be retrieved or generated by the target device, and encrypted transferred key to the target secure device, for the target secure device, generating or retrieving the transport key from the key transfer information and using the transport key to decrypt the transferred key.

These further steps are adapted to the case where the source device also used transport key information to generate or retrieve the transport key before encrypting the key to be transferred. However steps performed on the source side and steps performed on target side can occur independently from each other. The exact sequence of these steps will depend upon the kind of transport key used.

According to a preferred embodiment, the source asynchronous notification comprises at least a notification id, key transfer request notification and an URI for the source secure device to connect back.

Such content for the source asynchronous notification is simple and provides to the source device the necessary elements to implement the further steps of the invention.

According to a preferred embodiment, the target asynchronous notification includes at least a notification id, a key transfer event information and a URI for sending back a request.

This content for the notification is simple while providing the necessary elements to proceed to the steps of the invention.

In specific embodiments, the asynchronous notifications are through one of the following: Internet, Web, SMS, phone push notification, email.

Those communication means are common and able to support the notification of the invention.

According to a particular embodiment, encrypted transferred key is a user key associated to a user and transport key information comprises a username.

This embodiment corresponds to the situation of one user using several devices to access his data. The username enables the devices to know which transport key mechanism and which transport key is to be used.

According to another particular embodiment, the transferred key is a secret key to be shared by one or more users.

In this case the method of the invention is used to transfer the secret key to each of the device of the plurality of users or to transfer the secret key to several devices of a same user in order for them to share this secret key and to use it for a pre-specified purpose.

In another embodiment of the invention, the transport key is retrieved from a directory like LDAP, Active Directory or any other data base.

With this embodiment, several connected databases are implicated in the implementation of the invention and the invention enables to rely on already existing data base to deploy a key provisioning as defined in the invention. According to a particular feature, the transferred key is encrypted using the public key of the target secure device.

This feature implies the deployment of an asymmetric cryptography but, then, enables very simply that the single device able to decrypt is the right one. It requires the key to be transferred to be encrypted with the corresponding key each time a new target device is concerned.

According to a specific embodiment, a data container key is generated for each data container to be stored on a cloud service.

With this embodiment, each data container has a corresponding key that allows the transport key to be exchanged using this data container key. Once the transport key is exchanged, the actual key exchange can take place using this transport key—similarly to other embodiments.

While applying the invention, the secure device can be chosen from the group formed by smart cards (including various forms of UICC), Trusted Platform Module (TPM), Micro Secure Digital Card (Micro SD), Hardware Security Module (HSM), Trusted Execution Environment (TEE), USB token, embedded Secure Element (eSE).

The present invention also concerns a key provisioning server to implement the method of one or several of the preceding claims, this provisioning server including at least:
a transport management module,
an access control module making an access control decision to allow or disallow the key transfer,
a notification module to send source and target asynchronous notification,
a data base to store at least user identifiers, transport information metadata, encrypted keys to be transferred until sending.

Such a key provisioning server dedicated to the management of keys is able to process asynchronous notifications as used in the invention and to store the necessary elements to manage transport keys information if needed.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
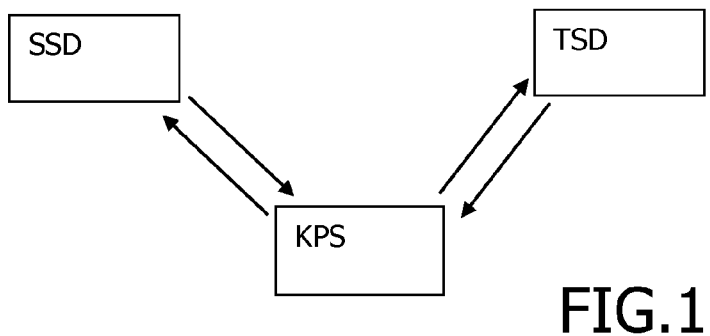
FIG. 1 schematically shows the context of the invention.

The same elements have been designated with the same reference numerals in the different drawings. For clarity, only those elements and steps which are useful to the understanding of the present invention have been shown in the drawings and will be described. Moreover, when an action is said to be performed by a device, it is in fact executed by a microprocessor in this device controlled by instruction codes recorded in a program memory on the said device.

FIG. 1 schematically shows the context of the invention. The invention proposes to securely and asynchronously provision keys from one secure source device SSD to another secure device, called target secure device TSD. To reach this objective the invention implements a key provisioning server KPS. Source and target secure device can be of many different types of secure devices, for example, smart card (UICC . . . ), secure MicroSD, TEE, HSM, and so on.

Figure 2:
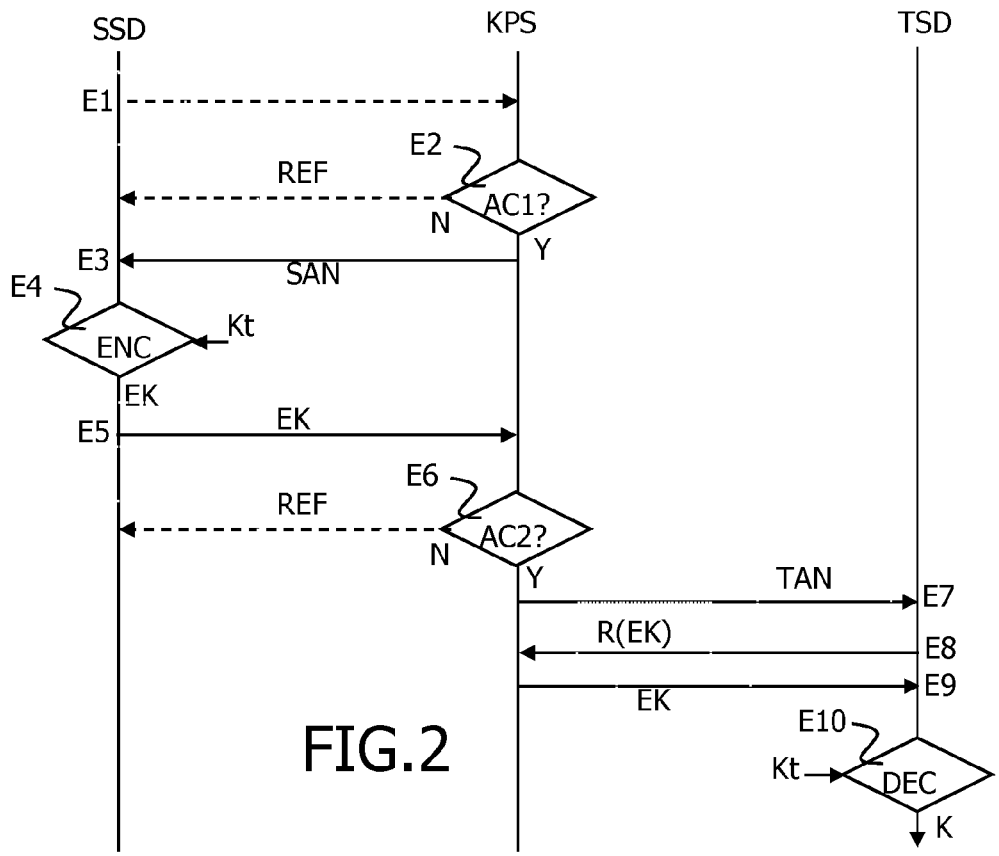
FIG. 2 shows a flowchart describing the method of the invention.

FIG. 2 is a flowchart representing the method of the invention. In a first step E1, a key transfer request is triggered at the key provisioning server KPS. This can be done in a number of ways. For example, a user connects to the server KPS web interface or an application server calls a REST API of the server KPS. In another example, the user interacts with a mobile app that connects to the server KPS. The user wants the server KPS to transfer a key from the source secure device SSD to a target secure device TSD. In FIG. 2, the transfer request is represented with a dashed line and is triggered from the source secure device SSD.

In a second step E2, an access control AC1 is performed. During this step, the server KPS makes a decision to allow or disallow the key transfer. This access control AC1 includes, but is not limited to, authenticating the user and/or the device and enforcing an access control policy. The access control policy can include rules, such as, if the user has the permission to do the action, if the device SSD has the permission to transfer a key, and if the owner of the device TSD has the privilege or if the device TSD has the permission to receive the key.

In the case the access control is negative (N), the user is informed of the refusal REF and the request is rejected. If the access control decision is positive (Y), the server KPS proceeds to step E3.

In this third step E3, the server KPS sends an asynchronous notification SAN to the device SSD. This asynchronous notification SAN includes a notification id (e.g. id1), a reason for the notification (e.g. "key transfer source"), and the URI for the device SSD to connect back. There are number of ways to send notification, for example, through Internet, SMS, phone push notification, email, etc.

The device SSD may be busy when the notification SAN arrives or may be off-line.

Once it processes the notification and is ready to respond, the device SSD proceeds to a step E4. In this step E4, it encrypts ENC the key material K to be transferred using a transport key Kt.

This transport key Kt is generated or retrieved by the device SSD. According to the invention, this key Kt is such that only the device TSD can decrypt the messages encrypted with it.

In a step E5, the device SSD sends the encrypted key material EK to the server KPS. Advantageously, key transfer information is also transferred. It includes, for example, the device SSD ID, the device TSD ID and encryption information.

In step E6, another access control AC2 is performed and the server KPS then makes a decision to allow or not the transfer. This access control can be implemented in a way similar to the one in step E2.

Indeed, because the whole workflow is asynchronous, the situation may have changed since the process started. The access control AC2 at this stage is important. If the decision is positive (Y), a step E7 is performed. Otherwise (N), the process is terminated. In this last case, it can be advantageous to send a refusal notification REF to the device SSD if the transfer triggered was originated from this device.

In step E7, the server KPS sends a notification TAN asynchronously to the device TSD informing it of the key transfer event. It includes advantageously a new notification id (id2) and a URI for sending back a request.

The device TSD may be busy when the notification TAN arrives or may be off-line. Once it processes the notification TAN and is ready to respond, in a step E8, the device TSD sends a request R(EK) in order to get the transferred key to the server KPS. The device TSD may digitally sign the request R(EK).

In a step E9, the server KPS sends the encrypted transferred key. It may sign the response.

The device TSD generates or retrieves the transport key Kt and uses it to decrypt DEC the transferred key material EK in a step 10. The device TSD can then store and use securely the transferred crypto material K.

Advantageously, the server KPS deletes the encrypted transferred key material EK.

The communications between the entities SSD, TSD, KPS should be secured using secure communication protocols, such as SSL, TLS, HTTPS, and other secure messaging protocols. The entities can also use out-of-band methods, such as OTP to help establish secure communications.

Figure 3:
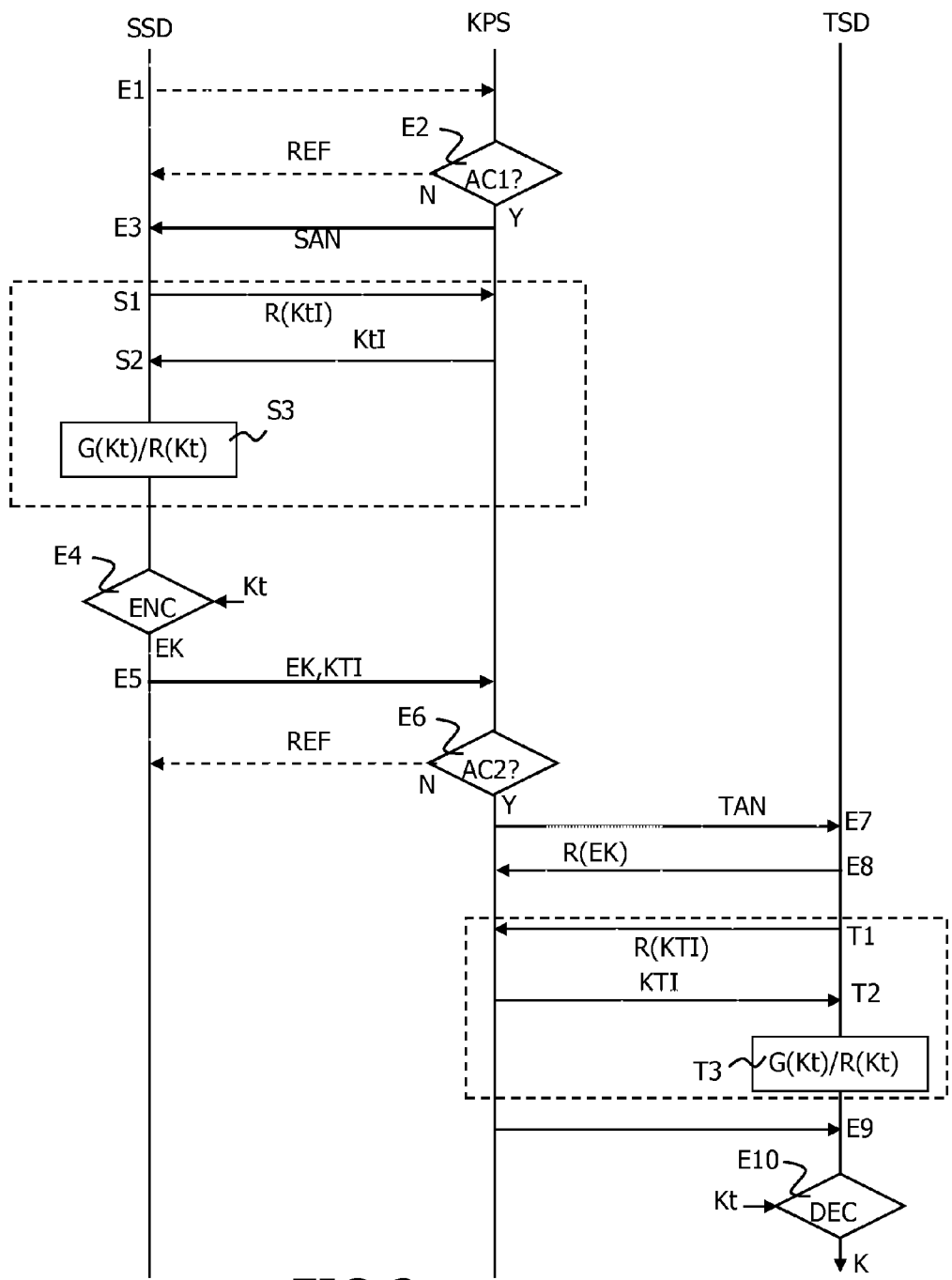
FIG. 3 shows a flowchart describing a specific embodiment of the invention.

According to an advantageous embodiment disclosed on FIG. 3, intermediary steps are implemented. These steps relate to the transport key management.

Thus after reception of the source asynchronous notification in step E3, in a step S1, the device SSD sends a request R(Ktl) to the server KPS in order to get transport key information Ktl. The device SSD may digitally sign this request R(Ktl).

In response, in a step S2, the server KPS sends transport key information Ktl to the device SSD. This information Ktl will enable, in a step S3, the device SSD to generate G(Kt) or retrieve R(Kt) the transport key Kt to be used for transferring K.

The information Ktl can include for instance the device TSD ID, the TSD's public key itself or the ID of the required cryptographic material Kt. The server KPS may digitally sign the response.

There are various implementations to this section, a non-exhaustive list being:
  a. The transport key is the public key of the device TSD, this public key being and directly included in Ktl
  b. A shared secret between the source device SSD and the target device TSD, and Ktl contain an ID of this key
  c. A derived key that only devices SSD and TSD can use, and Ktl contains the master secret ID and any data necessary for the derivation.
  d. The device SSD may retrieve the transport key from a secure database, or a directory, based on the TSD ID thus included in KtI.

In this embodiment, in step E5 of the method, the device SSD advantageously sends transport key information Ktl with the encrypted key material EK to the server KPS.

In this case, besides the request R(EK), the device TSD performs a request R(Ktl) for key transfer information KTI in a step T1. Such key transfer information KTI can be similar to transport key information Ktl but can also differ from this information. It can typically be a selection of data available in the transport key information Ktl.

The server KPS thus answers in a step T2 by sending key transfer information KTl. In a step T3, the device TSD generates G(Kt) or retrieves R(Kt) the transport key Kt based on the transfer information KTI. The mechanism is advantageously similar to the one used by device SSD in step S3 in the case transport key information is identical to key transfer information Ktl.

Once the device TSD has also received the encrypted key material EK in step E9, it is then able to decrypt DEC the encrypted key material EK in a step E10.

It has to be noted that steps E8, E9, T1 and T2 were disclosed separately and in a specific order. However these steps can also be simultaneous. For example, the message sent to transfer EK to the device TSD also includes information about the transfer KTI.

Figure 4:
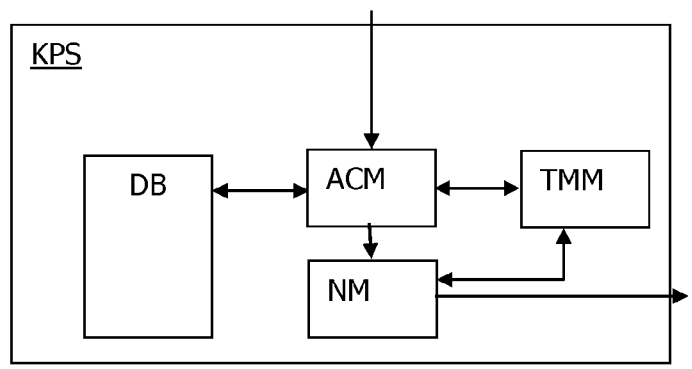
FIG. 4 schematically shows a key provisioning server according to the invention.

FIG. 4 schematically discloses a server KPS implementing the invention. This server KPS comprises a transfer management module TMM monitoring several modules intended to implement the invention. Those modules include an access control module ACM to perform steps E2 and E6 of the invention and a notification module NM intended to process and send asynchronous notifications.

This server also includes a data base DB intended to interact with the access control module ACM and the notification module NM. The data base DB stores at least user identifiers, transport information metadata, encrypted keys to be transferred until sent. At last the server has advantageously a crypto module to sign the messages that are sent from KPS and to verify messages that are received by KPS, providing mutual authentication between devices SSD and TSD and the server KPS.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for securely and asynchronously provisioning keys from one source secure device to a target secure device through a key provisioning server for which the keys to be provisioned through the method remain unknown, comprising the steps of:
triggering a key transfer at the key provisioning server,
in the key provisioning server,
making a first access control decision to allow or disallow the key transfer, and
if the transfer is allowed, sending a source asynchronous notification to the source secure device,
in the source secure device,
encrypting a key to be transferred using a transport key so that only the target secure device can decrypt, and
sending the encrypted key to the provisioning server, wherein the provisioning server has no knowledge of the transferred key,
in the provisioning server,
making a second access control decision, and
if the transfer is allowed, sending a target asynchronous notification to the target secure device, and
in the target secure device,
obtaining the encrypted transferred key, and
decrypting the transferred key using the transport key.

2. The method according to claim 1, wherein said server is a web application server.

3. The method according to claim 1, further comprising, after the sending of the source asynchronous notification, the steps of:
in the source secure device, sending a request to the provisioning server to obtain transport key information,
in the provisioning server, sending transport key information to the source secure device,
in the source secure device:
generating or retrieving the transport key using the transport key information;
encrypting the key to be transferred using the transport key; and
sending the encrypted key and key transfer information to the provisioning server.

4. The method according to claim 1, further comprising, after the sending of the target asynchronous notification, the steps of:
in the target secure device, sending a request to the provisioning server to obtain the transferred key,
in the provisioning server, sending key transfer information, which indicates how the transport key can be retrieved or generated by the target secure device, and the encrypted transferred key to the target secure device,
in the target secure device, generating or retrieving the transport key from the key transfer information and using the transport key to decrypt the transferred key.

5. The method according to claim 1, wherein the source asynchronous notification comprises at least a notification id, key transfer request's notification and an URI for the source secure device to connect back.

6. The method according to claim 1, wherein the target asynchronous notification includes at least a notification id, a key transfer event information and a URI for sending back a request.

7. The method according to claim 1, wherein the asynchronous notifications are through one of the following: Internet, Web, SMS, phone push notification, and email.

8. The method according to claim 1, wherein the encrypted transferred key is a user key associated with a user and transport key information comprises a username.

9. The method according to claim 1, wherein the transferred key is a secret key to be shared by one or more users.

10. The method according to claim 1, wherein the transport key is retrieved from a directory comprised of one of LDAP, Active Directory or any other data base.

11. The method according to claim 1, wherein the transferred key is encrypted using a public key of the target secure device.

12. The method according to claim 1, wherein a data container key is generated for a data container to be stored on a cloud service.

13. The method according to claim 1, wherein secure devices are chosen from the group formed by smart cards (UICC. . .), Trusted Platform Module (TPM), Micro Secure Digital Card (Micro SD), Hardware Security Module (HSM), Trusted Execution Environment (TEE), USB token, and embedded Secure Element (eSE).

14. A key provisioning server to perform the method of claim 1, the provisioning server being configured to implement at least:
a transport management module to monitor:
an access control module making an access control decision to allow or disallow the key transfer, and
a notification module to send source and target asynchronous notifications; and
a data base to store at least user identifiers, transport information metadata, and encrypted keys to be transferred until sending.

* * * * *